United States Patent
Wu et al.

(10) Patent No.: US 9,479,477 B2
(45) Date of Patent: Oct. 25, 2016

(54) METHOD AND APPARATUS FOR REGISTERING TERMINAL

(71) Applicant: ZTE Corporation, Shenzhen (CN)

(72) Inventors: Hao Wu, Shenzhen (CN); Fang Xie, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/431,548

(22) PCT Filed: Sep. 5, 2013

(86) PCT No.: PCT/CN2013/083022
§ 371 (c)(1),
(2) Date: Mar. 26, 2015

(87) PCT Pub. No.: WO2014/048236
PCT Pub. Date: Apr. 3, 2014

(65) Prior Publication Data
US 2015/0229605 A1 Aug. 13, 2015

(30) Foreign Application Priority Data
Sep. 26, 2012 (CN) .......................... 2012 1 0363654

(51) Int. Cl.
*H04L 29/06* (2006.01)
*H04W 12/06* (2009.01)
(Continued)

(52) U.S. Cl.
CPC .............. *H04L 63/02* (2013.01); *H04L 63/08* (2013.01); *H04L 67/10* (2013.01); *H04W 4/005* (2013.01); *H04W 12/06* (2013.01); *H04L 63/0884* (2013.01)

(58) Field of Classification Search
None
See application file for complete search history.

(56) References Cited

U.S. PATENT DOCUMENTS 7,114,180 B1* 9/2006 DeCaprio ............... G06F 21/31
709/219
9,317,688 B2* 4/2016 Yegin ..................... G06F 21/57
(Continued)

FOREIGN PATENT DOCUMENTS

CN 102026188 A 4/2011
CN 102215560 A 10/2011
(Continued)

OTHER PUBLICATIONS

International Search Report for corresponding application PCT/CN2013/083022 filed Sep. 5, 2013; Mail date Nov. 28, 2013.
(Continued)

*Primary Examiner* — Hadi Armouche
*Assistant Examiner* — Malcolm Cribbs
(74) *Attorney, Agent, or Firm* — Cantor Colburn LLP

(57) ABSTRACT

Provided are a method and an apparatus for registering a terminal. The method includes: after a gateway receives a registration request of a peripheral of a terminal, the gateway authenticating and verifying the peripheral of the terminal; after the authentication and verification are passed, the gateway initiating a remote registration request to a machine-to-machine (M2M) service platform or an M2M application, the remote registration request being used for requesting the M2M service platform or the M2M application to register the peripheral of the terminal to the M2M service platform or the M2M application. Based on the technical solutions, technical problems such as low security and privacy in M2M network communications in the related art are solved, and registration of a terminal is locally verified, thereby further improving the security and privacy in M2M network communications.

14 Claims, 2 Drawing Sheets

(51) Int. Cl.
H04W 4/00 (2009.01)
H04L 29/08 (2006.01)

(56) References Cited

U.S. PATENT DOCUMENTS

| | | | | |
|---|---|---|---|---|
| 2003/0016628 A1* | 1/2003 | Kadambi | ............ | H04L 12/4641 370/235 |
| 2003/0186680 A1* | 10/2003 | Bhasin | ................ | H04L 29/1216 455/411 |
| 2007/0133763 A1* | 6/2007 | D'Angelo | ............. | G06Q 30/04 379/93.02 |
| 2008/0176582 A1* | 7/2008 | Ghai | ........................ | H04W 4/02 455/456.2 |
| 2008/0181239 A1* | 7/2008 | Wood | .................... | H04L 63/083 370/401 |
| 2009/0113539 A1* | 4/2009 | Shu | ...................... | H04L 12/2821 726/12 |
| 2009/0197571 A1* | 8/2009 | Kitajima | ............... | H04W 12/06 455/411 |
| 2009/0282458 A1* | 11/2009 | Hjelm | ..................... | H04L 69/24 726/1 |
| 2011/0035584 A1* | 2/2011 | Meyerstein | ........... | H04W 8/265 713/155 |
| 2011/0213871 A1* | 9/2011 | DiGirolamo | ............ | H04W 4/00 709/223 |
| 2011/0268047 A1* | 11/2011 | Nath | ...................... | H04W 4/005 370/329 |
| 2012/0047551 A1* | 2/2012 | Pattar | ...................... | H04W 4/00 726/1 |
| 2012/0265983 A1* | 10/2012 | Yegin | ..................... | G06F 21/57 713/155 |
| 2012/0331298 A1* | 12/2012 | Xu | .......................... | H04L 63/08 713/171 |
| 2013/0017827 A1* | 1/2013 | Muhanna | ............... | H04W 4/005 455/426.1 |
| 2013/0246519 A1* | 9/2013 | Foti | ......................... | H04W 4/08 709/204 |
| 2013/0262576 A1* | 10/2013 | Foti | ....................... | H04W 4/005 709/204 |
| 2014/0003339 A1* | 1/2014 | Jain | ....................... | H04W 28/08 370/328 |
| 2014/0126581 A1* | 5/2014 | Wang | ..................... | H04W 4/001 370/431 |

FOREIGN PATENT DOCUMENTS

| | | |
|---|---|---|
| CN | 102238000 A | 11/2011 |
| CN | 102687547 A | 9/2012 |
| EP | 2894912 A1 | 7/2015 |
| WO | 2011082150 A1 | 7/2011 |
| WO | 2011112683 A1 | 9/2011 |

OTHER PUBLICATIONS

Barbara Pareglio et al. "Overview of ETSI M2M Architecture" Oct. 2011, pp. 8-14, XP05509824, URL:http://www.gisfi.org/wg_documents/GISFI_IoT_20112161.pdf.

EP Search Report issued Sep. 10, 2015 re: Application No. PCT/CN2013/083022; citing: WO 2011/11283 A1, WO 2011/082150 A1, B. Pareglio et al. "Overview of ETSI . . . " and EP 2 894 912 A1.

* cited by examiner

METHOD AND APPARATUS FOR REGISTERING TERMINAL

TECHNICAL FIELD

The embodiments of the disclosure relate to the communication field, and in particular to a method and an apparatus for registering a terminal

BACKGROUND

A Machine-To-Machine (called M2M for short) communication network extends the communication scope and the communication field of an existing information communication network. The M2M communication network acquires information from the physical world by embedding intelligence and communication capabilities in various possible objects, and enhances and improves the intelligence, interactivity and the degree of automation of an existing information communication network service based on the analysis and the process performed on the acquired information.

The M2M communication network has multiple network forms, which may be an independent physical network constructed alone, and may also be a logical network constructed on an existing public communication network and various government and enterprise private networks.

The M2M communication network can be divided into three layers on logical functions, namely: a perception extension layer, a network/service layer and an application layer.

The perception extension layer mainly realizes a collection of information about the physical world, automatic identification and intelligent control. Various objects themselves in the physical world do not have communication capability. Intelligent nodes such as a sensor, an actuator, an intelligent apparatus, a Radio Frequency Identification (called RFID for short) reader/writer and so on, collect information about the physical world, and perform information interaction with a network layer through a communication module. The main components mainly contained in the perception extension layer include a terminal peripheral device and an M2M gateway.

The network/service layer supports the delivery, routing and control of information of the perception layer, and provides support for the human-to-thing communication and thing-to-thing communication in the Internet of Things. Combined with the Internet of Things to perform classification, network forms contained in a network level specifically include: a communication network, Internet, an industry network and so on. The main component contained in the network/service layer is an M2M platform.

The application layer contains various specific applications of Internet of Things, e.g., public services and industry services. The industry service may be an industry public service facing to the public, and may also be an industry-specific service satisfying specific application requirements within the industry. The public service is a basic service provided to meet general public requirements, for example, intelligent home, mobile payment and so on. The industry-specific service is generally a service provided to the industry interior to meet specific requirements of the industry itself, for example, intelligent grids, intelligent transportation, intelligent environment and so on. Some of the industry services therein may also be provided to the public, for example, intelligent transportation, and this type of industry service is referred to as the industry public service. The main component contained in the application layer is an M2M application server.

The peripheral of the terminal refers to a single device such as a sensor having an environment perception function, and the like. The peripheral of the terminal can send the perceived information to an M2M service platform or an M2M application through an M2M gateway. Meanwhile, the peripheral of the terminal may also receive downlink control from an M2M application or an M2M service platform.

Since the peripheral of the terminal only has characteristics such as a processing capability, a storage capability, and power source limitation and so on, but can not directly communicate with the communication network, the peripheral of the terminal needs to access the communication network by means of the M2M gateway. The M2M gateway can perform protocol conversion between an M2M perception extension layer and an upper layer network. The M2M gateway, apart from being able to converge and forward data information collected by the peripheral of the terminal, is also able to receive control information from the M2M application or the M2M service platform for managing the peripheral of the terminal.

The M2M platform provides some common capabilities and supports, as well as an open interface for the M2M application, so that the application can access and use network resources and capabilities. It is able to simplify and reduce the complexity of application development and deployment of an upper layer Internet of Things by shielding a specific M2M application from specific network implementation on the bottom layer.

However, the terminal peripheral device can be used normally only after being registered successfully. In the related art, the M2M gateway serves as a relay in a registration process, that is, the M2M gateway forwards the registration request sent by the peripheral of the terminal to the M2M platform or the M2M application server. However, since there is no corresponding verification measure for a terminal registration request at the M2M gateway, the existing M2M network has the problems such as low security and privacy and so on.

Aiming at the above-mentioned problems in the related art, no effective solution has been proposed so far.

SUMMARY

Aiming at the technical problems such as low security and privacy existed in M2M network communications in the related art, the embodiments of the disclosure provide a method and an apparatus for registering a terminal, to at least solve the above-mentioned problems.

According to the embodiment of the disclosure, there is provided a method for registering a terminal, including: after a gateway receives a registration request of a peripheral of a terminal, the gateway authenticates and verifies the peripheral of the terminal; after the authentication and verification are passed, the gateway initiates a remote registration request to a Machine-to-Machine, M2M, service platform or an M2M application, wherein the remote registration request is used for requesting the M2M service platform or the M2M application to register the peripheral of the terminal to the M2M service platform or the M2M application.

Before initiating the remote registration request to the M2M service platform or the M2M application, the method includes: the gateway acquires indication information, wherein the indication information is used for indicating whether the peripheral of the terminal supports remote management, and initiates the remote registration request to the M2M service platform or the M2M application in the case that the indication information indicates the peripheral of the terminal supports the remote management.

The gateway acquires indication information, includes: the gateway acquires the indication information from the registration request.

The gateway acquiring indication information, includes: the gateway acquires the indication information from subscription information.

After the authentication and verification are passed, the method further includes: the gateway acquires device description information and/or application description information of the peripheral of the terminal.

The gateway acquires device description information and/or application description information of the peripheral of the terminal, including: the gateway sends a request message to the peripheral of the terminal, wherein the request is used for requesting the device description information and/or the application description information; and the gateway receives the device description information and/or the application description information sent by the peripheral of the terminal according to the request message.

After the authentication and verification are passed, the method further includes: the gateway assigns an address or identification to the peripheral of the terminal, and saves information about the peripheral of the terminal, wherein the information about the peripheral of the terminal includes the following information: an address or identification of the peripheral of the terminal, and/or a state of the peripheral of the terminal After the gateway assigns the address or identification to the peripheral of the terminal, and saves information about the peripheral of the terminal, the method further includes: the gateway sends a registration confirmation message to the peripheral of the terminal, wherein the registration confirmation message includes: indication information about successful registration of the peripheral of the terminal, and the address or identification assigned by the gateway to the peripheral of the terminal.

If the authentication and verification performed by the gateway on the peripheral of the terminal fail, then the gateway sends a registration confirmation message to the peripheral of the terminal, wherein the registration confirmation message indicates that local registration of the peripheral of the terminal fails.

After the gateway initiates a remote registration request to the M2M service platform or the M2M application, the method further includes: after the gateway receives a registration failure message, the remote registration request is re-sent within a predetermined time.

The method further includes: when the number of times that the gateway receives the registration failure message reaches a predetermined number, the gateway stopping sending the remote registration request.

According to another embodiment of the disclosure, there is provided an apparatus for registering a terminal, located in a gateway, including: an authentication component, configured to, after receiving a registration request from a peripheral of a terminal, authenticate and verify the peripheral of the terminal; and a sending component, configured to, after the authentication and verification are passed, initiate a remote registration request to a Machine-to-Machine, M2M, service platform or an M2M application, wherein the remote registration request is used for requesting the M2M service platform or the M2M application to register the peripheral of the terminal to the M2M service platform or the M2M application..

The apparatus further includes: an acquisition component, configured to, acquire indication information, wherein the indication information is used for indicating whether the peripheral of the terminal supports remote management, and initiate the remote registration request to the M2M service platform or the M2M application in the case that the indication information indicates the peripheral of the terminal supports the remote management.

Through the embodiment of the disclosure, adopting the technical means that the gateway, after firstly authenticating and verifying (i.e. registering in the gateway) the peripheral of the terminal, requests for registration to the M2M service platform or the M2M application, technical problems such as low security and privacy in M2M network communications in the related art are solved, and registration of a terminal is locally verified, thereby further improving the security and privacy in M2M network communications.

DESCRIPTION OF DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION

The disclosure will be described hereinafter in detail with reference to the accompanying drawings and in conjunction with embodiments. It needs to note that the embodiments of the present application and the features in the embodiments can be combined with each other if there is no conflict.

Considering in the related art that the technical problems such as low security and privacy exist in M2M network communications, related solutions are provided in conjunction with embodiments below, and detailed description are as follows:

Embodiment 1

Figure 1:
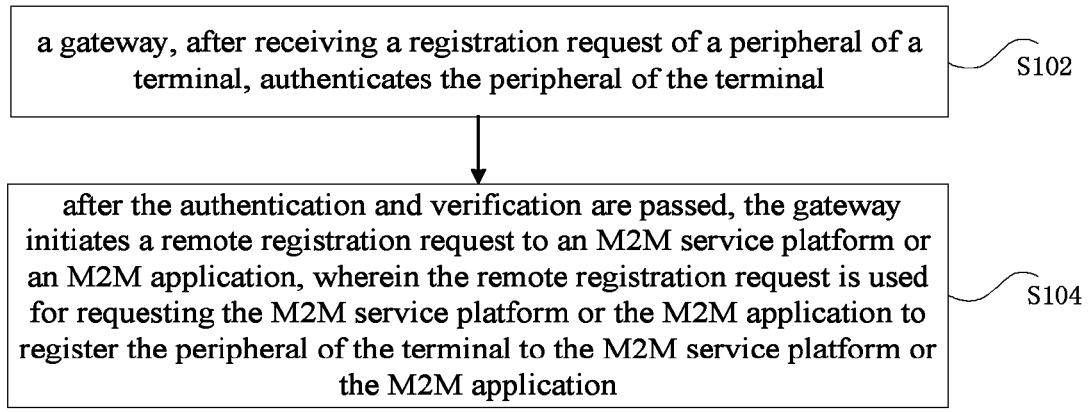
FIG. 1 is a flow chart of a method for registering a terminal according to embodiment 1 of the disclosure.

FIG. 1 is a flow chart of method for registering a terminal according to embodiment 1 of the disclosure. As shown in FIG. 1, the method includes:

step S102, a gateway, after receiving a registration request of a peripheral of a terminal, authenticates and verifies the peripheral of the terminal; and step S104, after the authentication and verification are passed, the gateway initiates a remote registration request to an M2M service platform or an M2M application, wherein the remote registration request is used for requesting the M2M service platform or the M2M application to register the peripheral of the terminal to the M2M service platform or the M2M application.

Through the above-mentioned processing steps, and since the gateway side authenticates and verifies a registration request of the peripheral of the terminal, and initiates again a registration request to the M2M network after the authentication and verification are passed, local verification on the terminal registration process is added, thereby improving security and privacy in the registration process.

In the present embodiment, step S102 can be represented in the following processing process: the terminal sends a registration request message to the gateway; and the gateway authenticates and verifies the terminal;

and accordingly, step S104 can be represented in the following implementation form: after the authentication and verification are passed, the gateway assigns an address or identification to the peripheral of the terminal. The gateway sets the state of the peripheral of the terminal as "local registration succeeds", and saves information about the peripheral of the terminal; and the gateway sends a registration confirmation message to the terminal, indicating same to complete local registration.

Before initiating a remote registration request to the M2M network, in order to prevent the terminal which does not support remote management in the M2M network from being verified, thereby wasting operational resources, the gateway needs to acquire indication information, wherein the indication information is used for indicating whether the peripheral of the terminal supports remote management, and initiate the remote registration request to the M2M service platform or the M2M application in the case that the indication information indicates the peripheral of the terminal supports the remote management.

In the present embodiment, there are multiple methods for the gateway to acquire indication information, for example, it may acquire indication information from the remote registration request, and it may acquire indication information from the subscription information saved locally, but the present embodiment is not limited to the above-mentioned two methods.

After authentication and verification are passed, the gateway needs to acquire device description information and/or application description information of the peripheral of the terminal.

In the present embodiment, the gateway may acquire device description information and application description information of the peripheral of the terminal through multiple methods, for example, locally pre-configuring, or acquiring through the following methods: the gateway sends a request message to the peripheral of the terminal, wherein the request message is used for requesting the device description information and/or the application description information; and the gateway receives the device description information and/or the application description information sent by the peripheral of the terminal according to the request message.

After the authentication and verification are passed, the gateway assigns an address or identification to the peripheral of the terminal, and saves information about the peripheral of the terminal, wherein the information about the peripheral of the terminal may includes but not limited to the following information: an identification of the peripheral of the terminal or an address of the peripheral of the terminal, and a state of the peripheral of the terminal.

In the present embodiment, after the gateway assigns the address or identification to the peripheral of the terminal, and saves the information about the peripheral of the terminal, the gateway sends a registration confirmation message to the peripheral of the terminal, wherein the registration confirmation message includes: indication information about successful registration of the peripheral of the terminal, and the address or identification assigned by the gateway to the peripheral of the terminal.

Accordingly, if the authentication and verification performed by the gateway on the peripheral of the terminal fail, then the gateway sends a registration confirmation message to the peripheral of the terminal, and the registration confirmation message indicates that local registration of the peripheral of the terminal fails.

After step S104, i.e. after the gateway initiates the remote registration request to the M2M service platform or the M2M application, the gateway, if receiving a registration failure message, may re-send the remote registration request within a predetermined time.

In order to prevent the gateway from ceaselessly sending the remote registration request, when the number of times that the gateway receives the registration failure message reaches a predetermined number, the gateway stops sending the remote registration request.

Figure 2:
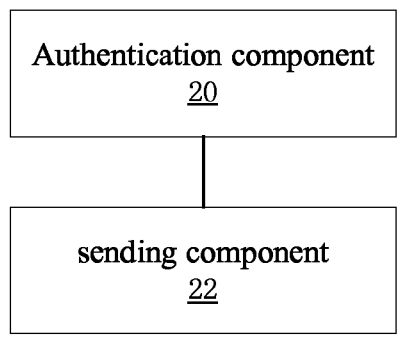
FIG. 2 is a structural block diagram of an apparatus for registering a terminal according to embodiment 1 of the disclosure.

The present embodiment further provides an apparatus for registering a terminal, the apparatus located in the gateway, configured to implement the above-mentioned embodiment and an example embodiment, has been described, and no further description is repeated herein, and the related modules in the apparatus is described below. As used below, the term "module" can implement a combination software and/or hardware with a predetermined function. Although the apparatus described in the embodiment below is preferably implemented by means of software, however, the implementation of hardware, or a combination of the software and hardware is also possible and is conceived. FIG. 2 is a structural block diagram of apparatus for registering a terminal according to embodiment 1 of the disclosure. As shown in FIG. 2, the apparatus includes:

an authentication and verification module 20, connected to a sending component 22, and configured to after receiving a registration request from a peripheral of a terminal, authenticate and verify the peripheral of the terminal; and a sending component 22, configured to, after the authentication and verification are passed, initiate a remote registration request to an M2M service platform or an M2M application, wherein the remote registration request is used for requesting the M2M service platform or the M2M application to register the peripheral of the terminal to the M2M service platform or the M2M application.

Through the function implemented by the processing module, local verification on the terminal registration process may be implemented as well, thereby improving security and privacy in the registration process.

Figure 3:
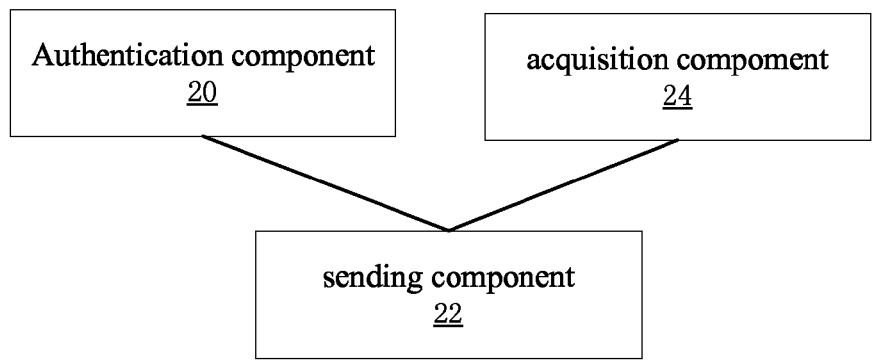
FIG. 3 is another structural block diagram of an apparatus for registering a terminal according to embodiment 1 of the disclosure.

In an example embodiment, the above-mentioned method embodiment is similar to the apparatus, as shown in FIG. 3, the apparatus further includes: an acquisition component 24, connected to the sending component 22, and configured to, acquire indication information, wherein the indication information is used for indicating whether the peripheral of the terminal supports remote management, and initiate the remote registration request to the M2M service platform or the M2M application in the case that the indication information indicates the peripheral of the terminal supports the remote management.

Embodiment 2

The main design idea of the present embodiment lies in: the peripheral of the terminal may be put into normal use only after the local gateway registers the peripheral of the terminal successfully, that is, when the peripheral of the terminal is in the unregistered state, it is needed to register the peripheral of the terminal to the M2M gateway before the peripheral of the terminal uses the M2M service.

Figure 4:
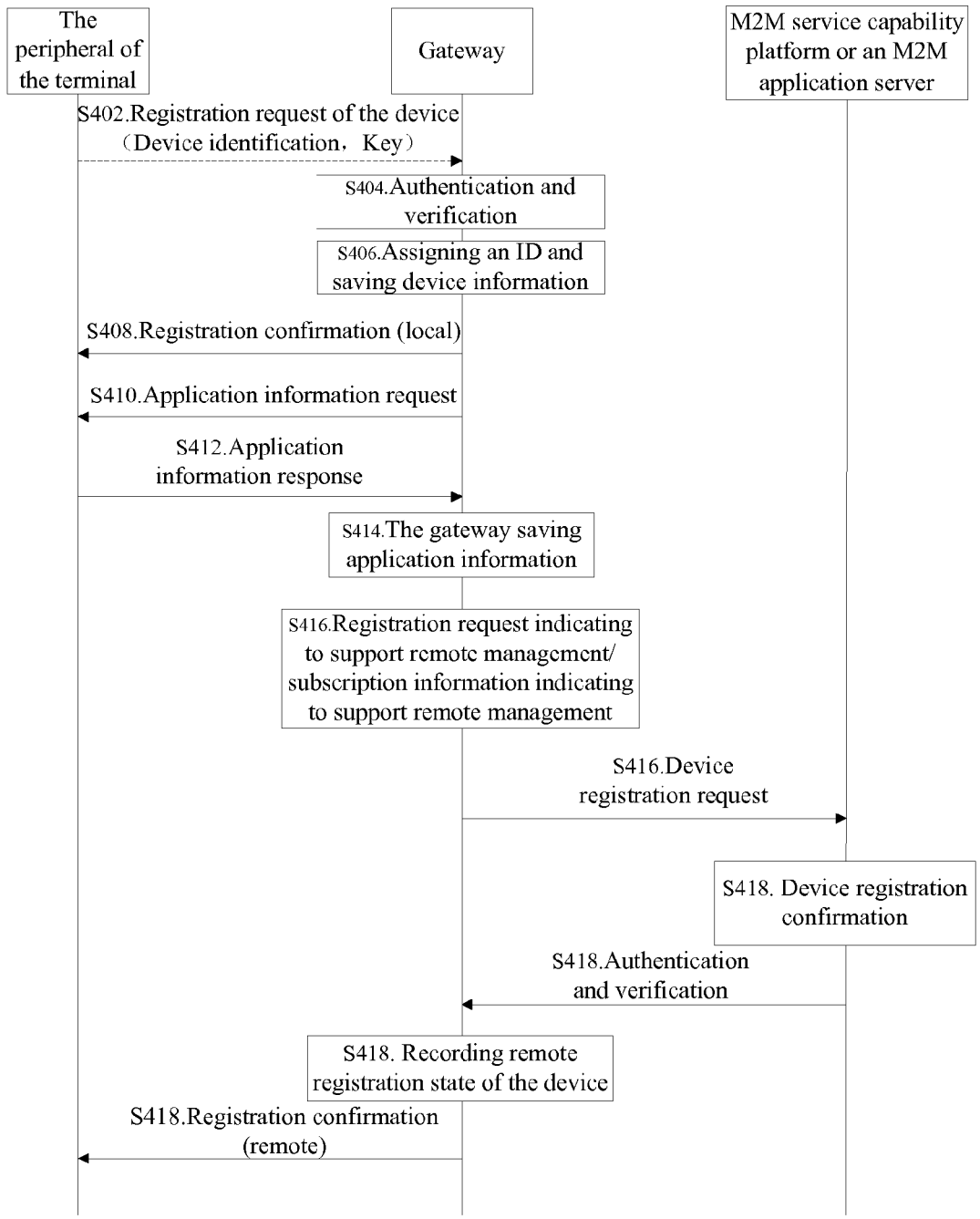
FIG. 4 is a schematic flow chart of a terminal performing M2M network registration according to embodiment 2 of the disclosure.

In the present embodiment, the flow of the peripheral of the terminal performing M2M network registration may refer to FIG. 4, and as shown in FIG. 4, the flow includes steps S402 to S418 which are described as follows.

In step S402, the peripheral of the terminal sends a registration request message to the gateway, wherein the registration request message contains identification and key of the terminal, or/and indication for supporting remote management.

In step S404, the gateway reads the key information from the registration request information, and authenticates and verifies the peripheral of the terminal by verifying whether the key is valid through local security algorithm.

In step S406, after the authentication and verification are passed, the gateway assigns the device information, e.g., the address or identification as shown in Table 1, to the peripheral of the terminal, sets the state of the peripheral of the terminal as "local registration succeeds", and saves information about the peripheral of the terminal, wherein the information includes an identification or address of the terminal, and a device state.

TABLE 1 device information

| information element | remark |
| --- | --- |
| device identification | identification of the device itself |
| device address | address assigned by the gateway |
| device state | local registration or remote registration |
| remote management (selectable) | indicator for indicating whether remote management is supported |

In step S408, the gateway sends the registration confirmation message to the peripheral of the terminal to indicate the peripheral of the terminal to complete registration, wherein the registration confirmation message contains identification or address assigned by the gateway.

It should be noted that, (not illustrated in FIG. 4) if the authentication and verification fail, the gateway sends registration confirmation information to the peripheral of the terminal, and notifies the peripheral of the terminal that local registration fails.

In step S410, the gateway sends request information (i.e. application information request) to the peripheral of the terminal, for requesting device and application description parameters. The device description parameter refers to a physical description parameter of the peripheral of the terminal, and represents what device the peripheral of the terminal is, for example, "television" and the manufacturer of the television and so on. The application description parameter refers to an application executable by the peripheral of the terminal, and the parameter corresponding to the application, for example, the television is capable of executing an IPTV application as well as a remote diagnostic application.

In step S412, the peripheral of the terminal, after receiving request information, sends device and application description parameters to the gateway via an application information response.

In step S414, the gateway saves application information, e.g., device description information (parameter) and application description information (parameter).

TABLE 2 application description information

| information element | |
| --- | --- |
| application identification | identification of the M2M application |
| device list | the peripheral of the terminal supporting the application or needed by the execution of the application |
| application attributes | parameter related to application execution and a preset execution policy are contained |

The gateway contains the above-mentioned information, but is not limited to only the above information.

If the authentication and verification fail, the gateway sends registration confirmation information to the peripheral of the terminal, and notifies the peripheral of the terminal that local registration fails.

In step S416, if the registration request message of the peripheral of the terminal indicates to support remote management, or the subscription information locally saved by the gateway indicates to support remote management, then the gateway sends a remote registration request to an M2M service capability platform or an M2M application server.

The M2M service capability platform is a network element used by the network side for managing the gateway, terminal and M2M application.

The M2M application server is a network element used for providing the M2M application.

In step S418, the M2M service capability platform or the M2M application server verifies the remote registration request. If the gateway receives a registration success confirmation message sent by the M2M service capability platform or the M2M application server (i.e., the authentication and verification by the M2M service capability platform or the M2M application server are passed), then the gateway sets the state of the peripheral of the terminal in local information as "local registration succeeds and remote registration succeeds" or "remote registration succeeds", and sends a registration confirmation message to the peripheral of the terminal, to indicate the peripheral of the terminal to complete remote registration.

In the present embodiment, the gateway, if receiving a registration failure confirmation message sent by the network side, initiates again a remote registration request to the network side after a preset waiting time. The gateway, if the number of times of receiving registration failure confirmation information reaches a maximum attempt number, stops initiating a remote registration request to the network side. The gateway sets the state of the peripheral of the terminal as "local registration succeeds and remote registration fails" or maintains the state as "local registration succeeds".

In another embodiment, software is provided, wherein the software is used for executing the above-mentioned embodiment and the technical solution described in the example embodiment.

In another embodiment, a storage medium is provided, wherein the storage medium stores the-above-mentioned software, and the storage medium includes but is not limited to: an optical disk, a floppy disk, a hard disk, an erasable storage or the like.

Apparently, those skilled in the art shall understand that the above modules and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the disclosure is not limited to any particular hardware and software combination.

The above description is only the example embodiments of the disclosure, which is not used to limit the disclosure, for those skilled in the art, the disclosure may have various changes and variations. Any modification, equivalent replacement, or improvement made within the spirit and principle of the disclosure shall all fall within the protection scope of the disclosure.

INDUSTRIAL APPLICABILITY

The above-mentioned technical solutions provided in the disclosure, can be applied in the registration process of the terminal, adopting the technical means that the gateway, after firstly authenticating and verifying (i.e. registering in the gateway) the peripheral of the terminal, requests for registration to the M2M service platform or the M2M application, technical problems such as low security and privacy in M2M network communications in the related art are solved, and registration of a terminal is locally verified, thereby further improving the security and privacy in M2M network communications.

What is claims:

1. A method for registering a terminal, comprising:
after receiving a registration request from a peripheral of a terminal, a gateway authenticating and verifying the peripheral of the terminal; and
after the authentication and verification are passed, the gateway initiating a remote registration request to a Machine-to-Machine, M2M, service platform or an M2M application, wherein the remote registration request is used for requesting the M2M service platform or the M2M application to register the peripheral of the terminal to the M2M service platform or the M2M application,
wherein after the authentication and verification are passed, the method further comprises: the gateway assigning an address or identification to the peripheral of the terminal, and saving information about the peripheral of the terminal;
wherein the information about the peripheral of the terminal comprises the following information: an address or identification of the peripheral of the terminal, and a state of the peripheral of the terminal, wherein the state of the peripheral of the terminal comprises one of the following: local registration state or remote registration state;
wherein before initiating the remote registration request to the M2M service platform or the M2M application, the method comprises: the gateway acquiring indication information, wherein the indication information is used for indicating whether the peripheral of the terminal supports remote management, and initiating the remote registration request to the M2M service platform or the M2M application in the case that the indication information indicates the peripheral of the terminal supports the remote management.

2. The method according to claim 1, the gateway acquiring the indication information comprises:

the gateway acquiring the indication information from the registration request.

3. The method according to claim 1, the gateway acquiring the indication information comprises:
the gateway acquiring the indication information from subscription information.

4. The method according to claim 1, after the authentication and verification are passed, the method further comprises:
the gateway acquiring device description information and/or application description information of the peripheral of the terminal.

5. The method according to claim 4, the gateway acquiring the device description information and/or the application description information of the peripheral of the terminal comprises:
the gateway sending a request message to the peripheral of the terminal, wherein the request message is used for requesting the device description information and/or the application description information; and
the gateway receiving the device description information and/or the application description information sent by the peripheral of the terminal according to the request message.

6. The method according to claim 1, after the gateway assigning the address or identification to the peripheral of the terminal, and saving the information about the peripheral of the terminal, the method further comprises:
the gateway sending a registration confirmation message to the peripheral of the terminal, wherein the registration confirmation message comprises: indication information about successful registration of the peripheral of the terminal, and the address or identification assigned by the gateway to the peripheral of the terminal.

7. The method according to claim 1,
if the authentication and verification performed by the gateway on the peripheral of the terminal fail, then the gateway sending a registration confirmation message to the peripheral of the terminal, wherein the registration confirmation message indicates that local registration of the peripheral of the terminal fails.

8. The method according to claim 1, after the gateway initiating the remote registration request to the M2M service platform or the M2M application, the method further comprises:
after the gateway receives a registration failure message, re-sending the remote registration request within a predetermined time.

9. The method according to claim 8, the method further comprises:
when the number of times that the gateway receives the registration failure message reaches a predetermined number, the gateway stopping sending the remote registration request.

10. An apparatus for registering a terminal, located in a gateway, comprising: a hardware processor executing instructions to:
after receiving a registration request from a peripheral of a terminal, authenticate and verify the peripheral of the terminal;
after the authentication and verification are passed, initiate a remote registration request to a Machine-to-Machine, M2M, service platform or an M2M application, wherein the remote registration request is used for requesting the M2M service platform or the M2M application to register the peripheral of the terminal to the M2M service platform or the M2M application;

assign an address or identification to the peripheral of the terminal, and save information about the peripheral of the terminal, wherein the information about the peripheral of the terminal comprises the following information: an address or identification of the peripheral of the terminal, and a state of the peripheral of the terminal, wherein the state of the peripheral of the terminal comprises one of the following: local registration state or remote registration state; and acquire indication information, wherein the indication information is used for indicating whether the peripheral of the terminal supports remote management, and initiate the remote registration request to the M2M service platform or the M2M application in the case that the indication information indicates the peripheral of the terminal supports the remote management.

11. The method according to claim 2, after the gateway initiating the remote registration request to the M2M service platform or the M2M application, the method further comprises:

after the gateway receives a registration failure message, re-sending the remote registration request within a predetermined time.

12. The method according to claim 3, after the gateway initiating the remote registration request to the M2M service platform or the M2M application, the method further comprises:

after the gateway receives a registration failure message, re-sending the remote registration request within a predetermined time.

13. The method according to claim 4, after the gateway initiating the remote registration request to the M2M service platform or the M2M application, the method further comprises:

after the gateway receives a registration failure message, re-sending the remote registration request within a predetermined time.

14. The method according to claim 5, after the gateway initiating the remote registration request to the M2M service platform or the M2M application, the method further comprises:

after the gateway receives a registration failure message, re-sending the remote registration request within a predetermined time.

\* \* \* \* \*